United States Patent
Franklin et al.

(10) Patent No.: US 7,962,783 B2
(45) Date of Patent: *Jun. 14, 2011

(54) PREVENTING WRITE CORRUPTION IN A RAID ARRAY

(75) Inventors: Chris Franklin, Merrimack, NH (US); Jeffery T. Wong, Newton, MA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/607,312

(22) Filed: Oct. 28, 2009

(65) Prior Publication Data

US 2010/0050016 A1    Feb. 25, 2010

Related U.S. Application Data

(63) Continuation of application No. 10/970,414, filed on Oct. 22, 2004, now Pat. No. 7,631,219.

(51) Int. Cl.
G06F 11/00 (2006.01)
(52) U.S. Cl. ............................... 714/7; 714/8
(58) Field of Classification Search .................. None
See application file for complete search history.

(56) References Cited

U.S. PATENT DOCUMENTS

| | | | | |
|---|---|---|---|---|
| 5,621,887 | A * | 4/1997 | Chatterji | 714/42 |
| 5,740,370 | A * | 4/1998 | Battersby et al. | 709/219 |
| 5,828,820 | A * | 10/1998 | Onishi et al. | 714/6 |
| 6,058,455 | A * | 5/2000 | Islam et al. | 711/114 |
| 6,658,591 | B1 * | 12/2003 | Arndt | 714/6 |
| 6,959,399 | B2 * | 10/2005 | King et al. | 714/6 |
| 7,293,195 | B1 * | 11/2007 | Watanabe et al. | 714/9 |
| 2002/0049886 | A1 * | 4/2002 | Furuya et al. | 711/114 |
| 2002/0194528 | A1 * | 12/2002 | Hart | 714/6 |
| 2005/0283655 | A1 * | 12/2005 | Ashmore | 714/7 |
| 2006/0047858 | A1 * | 3/2006 | Atherton et al. | 710/1 |

* cited by examiner

*Primary Examiner* — Gabriel L Chu
(74) *Attorney, Agent, or Firm* — Sterne, Kessler, Goldstein & Fox PLLC

(57) ABSTRACT

A method and related computer program product of preventing write corruption in a redundant array in a computer system, comprising detecting a write failure from a calling application to at least one disk of the redundant array, writing failure information to non-volatile storage; returning an I/O error to the calling application; reading the failure information from the non-volatile storage during the next system reboot; and reconfiguring the array to eliminate the failed disk.

20 Claims, 7 Drawing Sheets

PREVENTING WRITE CORRUPTION IN A RAID ARRAY

CROSS-REFERENCE TO RELATED APPLICATIONS

This application is a continuation of U.S. patent application Ser. No. 10/970,414, filed Oct. 22, 2004, which is incorporated herein by reference in its entirety.

BACKGROUND OF THE INVENTION

1. Field of the Invention

The disclosed invention relates to RAID array controllers, and more particularly to a method and computer program product for marking errors in BIOS.

2. Background Art

There are many applications, particularly in a business environment, where there are needs beyond what can be fulfilled by a single hard disk, regardless of its size, performance or quality level. Many businesses can't afford to have their systems go down for even an hour in the event of a disk failure. They need large storage subsystems with capacities in the terabytes. And they want to be able to insulate themselves from hardware failures to any extent possible. Some people working with multimedia files need fast data transfer exceeding what current drives can deliver, without spending a fortune on specialty drives. These situations require that the traditional "one hard disk per system" model be set aside and a new system employed. This technique is called Redundant Arrays of Inexpensive Disks or RAID. ("Inexpensive" is sometimes replaced with "Independent", but the former term is the one that was used when the term "RAID" was first coined by the researchers at the University of California at Berkeley, who first investigated the use of multiple-drive arrays in 1987. See D. Patterson, G. Gibson, and R. Katz. "A Case for Redundant Array of Inexpensive Disks (RAID)", Proceedings of ACM SIGMOD '88, pages 109-116, June 1988.

The fundamental structure of RAID is the array. An array is a collection of drives that is configured, formatted and managed in a particular way. The number of drives in the array, and the way that data is split between them, is what determines the RAID level, the capacity of the array, and its overall performance and data protection characteristics.

An array appears to the operating system to be a single logical hard disk. RAID employs the technique of striping, which involves partitioning each drive's storage space into units ranging from a sector (512 bytes) up to several megabytes. The stripes of all the disks are interleaved and addressed in order.

In a single-user system where large records, such as medical or other scientific images are stored, the stripes are typically set up to be relatively small (perhaps 64 k bytes) so that a single record often spans all disks and can be accessed quickly by reading all disks at the same time.

In a multi-user system, better performance requires establishing a stripe wide enough to hold the typical or maximum size record. This allows overlapped disk I/O (Input/Output) across drives.

Most modern, mid-range to high-end disk storage systems are arranged as RAID configurations. A number of RAID levels are known. RAID-0 "stripes" data across the disks. RAID-1 includes sets of N data disks and N mirror disks for storing copies of the data disks. RAID-3 includes sets of N data disks and one parity disk, and is accessed with synchronized spindles with hardware used to do the striping on the fly. RAID-4 also includes sets of N+1 disks, however, data transfers are performed in multi-block operations. RAID-5 distributes parity data across all disks in each set of N+1 disks. RAID levels 10, 30, 40, and 50 are hybrid levels that combine features of level 0, with features of levels 1, 3, and 5. One description of RAID types can be found at http://searchstorage.techtarget.com/sDefinition/0,,sid5_gci214332,00.html.

In the early days of RAID, fault tolerance was provided through redundancy. However, problems occurred in situations where a drive failed in a system that runs 24 hours a day, 7 days a week or in a system that runs 12 hours a day but had a drive go bad first thing in the morning. The redundancy would let the array continue to function, but in a degraded state. The hard disks were typically installed deep inside the server case. This required the case to be opened to access the failed drive and replace it. In order to change out the failed drive, the other drives in the array would have to be powered off, interrupting all users of the system.

If a drive fails in a RAID array that includes redundancy, it is desirable to replace the drive immediately so the array can be returned to normal operation. There are two reasons for this: fault tolerance and performance. If the drive is running in a degraded mode due to a drive failure, until the drive is replaced, most RAID levels will be running with no fault protection at all. At the same time, the performance of the array will most likely be reduced, sometimes substantially.

An important feature that allows availability to remain high when hardware fails and must be replaced is drive swapping. Strictly speaking, the term "drive swapping" simply refers to changing one drive for another. There are several types of drive swapping available.

"Hot Swap": A true hot swap is defined as one where the failed drive can be replaced while the rest of the system remains completely uninterrupted. This means the system carries on functioning, the bus keeps transferring data, and the hardware change is completely transparent.

"Warm Swap": In a so-called warm swap, the power remains on to the hardware and the operating system continues to function, but all activity must be stopped on the bus to which the device is connected.

"Cold Swap": With a cold swap, the system must be powered off before swapping out the disk drive.

Another approach to dealing with a bad drive is through the use of "hot spares." One or more additional drives are attached to the controller but are not used by I/O operations to the array. If a failure occurs, the controller can use the spare drive as a replacement for the bad drive.

The main advantage that hot sparing has over hot swapping is that with a controller that supports hot sparing, the rebuild will be automatic. The controller detects that a drive has failed, disables the failed drive, and immediately rebuilds the data onto the hot spare. This is an advantage for anyone managing many arrays, or for systems that run unattended.

Hot sparing and hot swapping are independent but not mutually exclusive. They will work together, and often are used in that way. However, sparing is particularly important if the system does not have hot swap (or warm swap) capability. The reason is that sparing will allow the array to get back into normal operating mode quickly, reducing the time that the array must operate while it is vulnerable to a disk failure. At any time either during rebuild to the hot spare or after rebuild, the failed drive can be swapped with a new drive. Following the replacement, the new drive is usually assigned to the original array as a new hot spare.

When a RAID array disk drive goes bad, the system must make changes to the configuration settings to prevent further writes and reads to and from the bad drive. Whenever a configuration change happens, the configuration changes have to be written out to all of the disks in the RAID array.

When the operating system or an application wants to access data on a hard disk before it has loaded native drivers for disk access, it traditionally employs BIOS services to do this. BIOS is the abbreviation for Basic Input/Output System. Various vendors, such as Acer America, San Jose, Calif., American Megatrends Inc., Norcross, Ga., and Phoenix Technologies Ltd., Milpatis, Calif., among many others, have their own versions of BIOS. The BIOS provides basic input and output routines for communicating between the software and the peripherals such as the keyboard, screen and the disk drive. The BIOS is built-in software that determines what a computer can do without accessing programs from a disk. The BIOS generally contains all the code required to control the keyboard, display screen, disk drives, serial communications, and a number of miscellaneous functions. While the access is not necessarily optimal, it is done through an easy to use interface. Minimal code can access these devices until the more optimal drivers take over.

The BIOS is typically placed on a ROM (Read Only Memory) chip that comes with the computer (it is often called a ROM BIOS). This ensures that the BIOS will always be available and will not be damaged by disk failures. It also makes it possible for a computer to boot itself.

When a drive failure occurs, it is necessary to make a configuration change to the array. If this is not done, applications will continue to write to and read from the bad drive. This will inevitably result in data corruption. However, there is only a limited amount of space in system memory, which makes it extremely difficult to manage configuration changes during boot up.

Every RAID controller uses configuration data to store the array information. This is known as controller metadata. The configuration information includes, among other things, the RAID level, how many disks in the array, the drive name or number, the location of the data, especially the starting location, and any other data required to enable the RAID controller to configure the RAID sets and provide the correct data back to the user.

Configuration data is modified on a regular basis. This is especially, but not only, the case where the system contains multiple RAID controllers and multiple arrays. It is not uncommon for RAID controllers to change the number of disks in their array. For example, the controller may add disks to its array to change from a RAID-1 array to a RAID-5 array. In another example, a disk in a given array may develop a fault and must be taken out of service. In either situation, the configuration data for the RAID array changes. The stored configuration data must be updated. Configuration data is normally stored on disk. Typically, the only configuration data stored is the most recently applied configuration.

When users perform complex tasks, they sometimes make mistakes that result in missing RAID arrays or lost data. It is very difficult to find out what happened and recover the missing arrays and data. This can be devastating to a business that has large numbers of records stored in the arrays. It is imperative that there be some way to recover the missing or lost data. Therefore, what is needed is a method and system to easily reconfigure RAID arrays and to recover missing arrays and data.

BRIEF SUMMARY OF THE INVENTION

The invention comprises a method and related computer program product of preventing write corruption in a redundant array in a computer system, comprising detecting a write failure from a calling application to at least one disk of the redundant array; writing failure information to non-volatile storage; returning an I/O error to the calling application; reading the failure information from the non-volatile storage during the next system reboot; and reconfiguring the array to eliminate the failed disk.

BRIEF DESCRIPTION OF THE DRAWINGS/FIGURES

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. This invention will be described in terms of a standard Intel® processor PC system. Those persons skilled in the relevant arts will recognize that this invention can be implemented with other processor PC systems equally as well.

The present invention is primarily directed to RAID controllers, and to redundant arrays. Redundant arrays are those in which the data is redundant, sufficiently so that if a drive fails, the data can be reconstructed from the remaining drives. Normally, during run time operations, a write failure or a read failure will never return an error to the caller (i.e., the application being executed). A drive failure error message occurs early during system boot up and initialization when BIOS is running.

An Interrupt is a signal from a peripheral device or a request from a program to perform a specific service. When an interrupt occurs, the currently executing program is temporarily suspended, and an interrupt routine begins execution to handle the condition that caused the interrupt. After the interrupt routine has completed its task, it issues the return instruction to resume the program.

There are two major types of interrupts—hardware interrupts and software interrupts. A software interrupt is an interrupt called by the INT instruction in a machine language program. A hardware device such as a disk drive, a keyboard or a mouse can trigger a hardware interrupt.

System memory contains a page of about 40 Hex vectors. These are locations in memory that are accessed to then point to specific code to be executed. Thus, for example, if the BIOS (Basic Input/Output Services) contains an Int13h command, I/O requests execute Int13h to access block data. During BIOS initialization (sometimes referred to as POST, or Power-On Self Test) the system interrupt vector(s) are programmed to access a specific code pointed to by that vendor's BIOS.

The primary interface to the BIOS is the software interrupt known as "Int13h", where "Int" stands for interrupt and "13h" is the number 19 in hexadecimal notation. The Int13h interface supports many different commands that can be given to the BIOS, which then passes them on to the hard disk. These include the normal disk related tasks of reading, writing, formatting, and so on.

When running a BIOS Int13h driver, there is a very limited amount of space in system memory that can be used for code. If an error occurs on a RAID set that is doing all the calculations in this environment, it is not possible to properly mark the drive as broken or defective.

Figure 1:
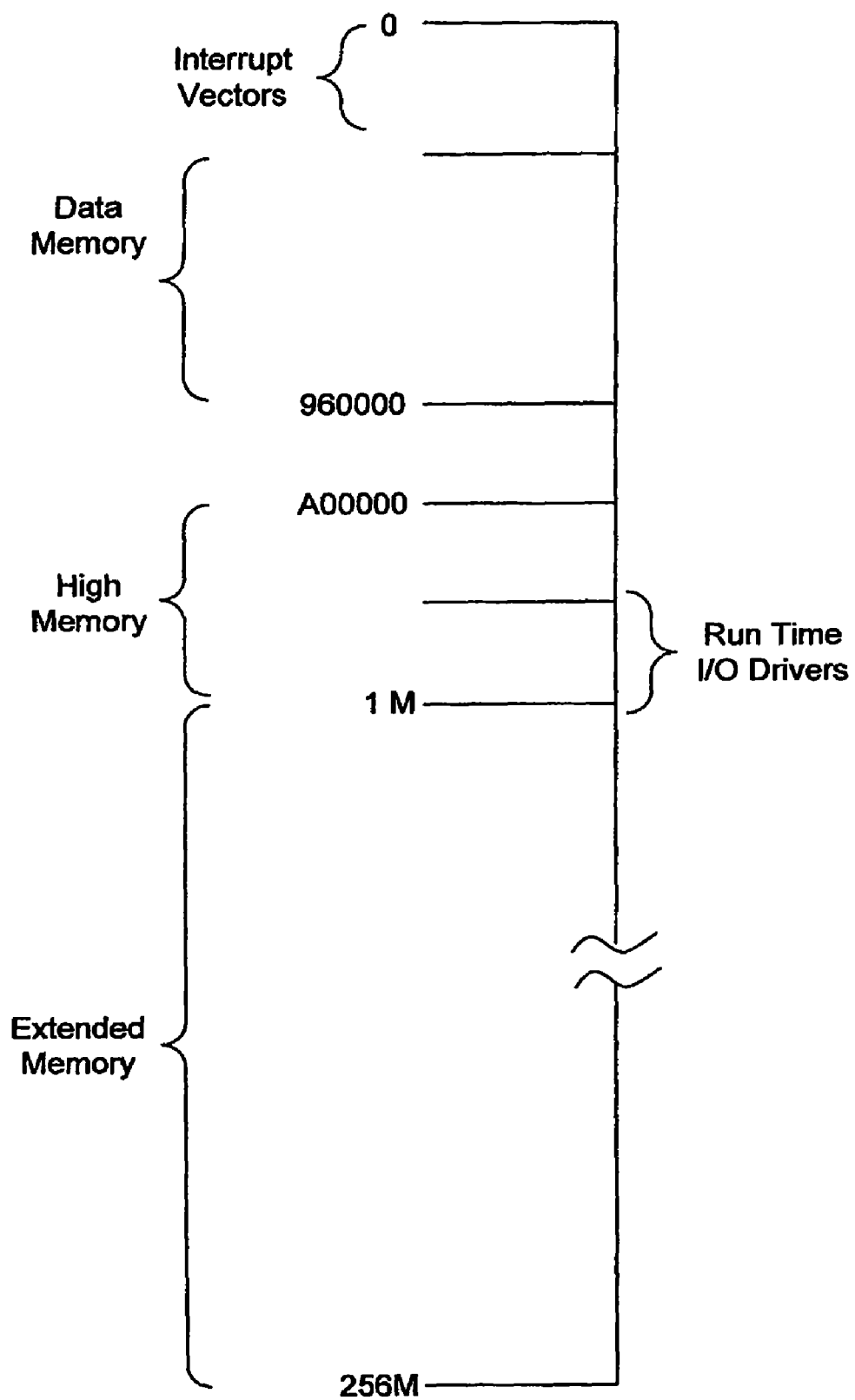
FIG. 1 shows a diagrammatic view of main memory in a computer system.

FIG. 1 shows a schematic diagram of system memory. In an exemplary embodiment, system memory contains 256 MB (megabytes) of storage space. It will be apparent to anyone skilled in the relevant art that this size is arbitrary. It is well known that in today's systems, memory can run anywhere from as low as 64 MB up to at least about 2 GB (gigabytes) or more. In any case, accessible BIOS memory takes up 1 MB of space. This is called "accessible memory" and comprises memory locations 00000 to 1 MB.

The BIOS routines must create, store and modify variables like any other routine. The BIOS stores these variables in the lower part of memory, typically starting at address 9A00:0000. BIOS functions occur through the individual routines contained in the BIOS interrupts 10H to 17H and 1AH. Usage of the functions is also standardized, to transfer data from the calling program to the interrupt and from the interrupt to the calling program.

The system memory occupying locations 0 though 0fffffh is denoted as "conventional memory." The amount of memory available for BIOS is 640 KB (Kilobytes), and goes from 0 through A00000. The first 40 address locations contain the interrupt vectors. System memory locations below A00000, starting below about location 96000, are called "data memory." Memory locations between A000000 and FFFFFF, an additional 360 KB, is called "high memory." All of the memory space above 1 MB is called "extended memory." This is where modern operating systems are loaded and where they execute their applications.

In a computer system having a RAID array, it is necessary to configure the array to get array information, to process conflicts, to create or delete an array, and in general to perform any array manipulation. Whenever an array manipulation is required, 64 KB of system memory is needed to perform the configuration steps. However, system BIOS only allows about 30 KB of memory space to be used for configuration data.

Many systems have 32 or more RAID disks, and several RAID controllers. Configuration information for these disks requires more memory space than the 30 KB that is allowed by system BIOS. There is a need to utilize up to 64 KB of memory in the BIOS data structure area, to be used only during POST. The problem occurs because there was no single specific region of data structure space that is always available and free.

If the system attempts to use memory space below (approximately) memory location 960000, it may run into system BIOS data structures. This can result in partial or complete system failure when POST is completed, so that nothing works any more. To avoid this problem, the area that can be used is the EBDA (Extended BIOS Data Area), also sometimes known as the Option ROM BIOS Data Area. The EBDA extends from somewhere above memory location 960000 to A000000. The closer one gets to memory location 960000 and below, the more likely it is that the operation will run into the system BIOS data area.

If a drive fails, it becomes necessary to update the configuration data. Changes to configuration parameters take place at initialization. To update the configuration data, it is desirable to have enough system memory available to manipulate the old data.

One aspect of the present invention, therefore, relates to obtaining 64 KB of conventional memory for use during POST and then returning that memory to BIOS after POST has been completed. The 64 KB figure was chosen because that is currently the maximum segment size in memory. Under current constraints, using more than 64 KB (e.g., 128 KB) of space would require manipulation of segments. Such manipulations require complex operations. Currently, 64 KB of space is more than enough to store configuration data. It should be clear to one skilled in the relevant arts that the amount of system memory to be temporarily moved to storage is not critical. It is a function of system design and process limitations.

A feature of the invention is to move whatever is in the 64 KB of selected space in conventional memory to disk during POST. This leaves that space open for configuration changes to be made during POST. At the end of POST, the data is returned from the disk to that 64 KB of space. The inventors have determined that the largest configuration packet that can be made under current constraints is about 49 KB, which is well within the 64 KB range used in this invention.

It is noted here that the data to be moved out of conventional memory temporarily can be stored in other locations than to disk. The data can be stored in flash or DRAM on the controller, for example. The temporary storage location is not critical, as long as the data is temporarily removed from conventional memory during the configuration process and is then returned to that conventional memory space at the conclusion of the configuration steps.

Figure 2:
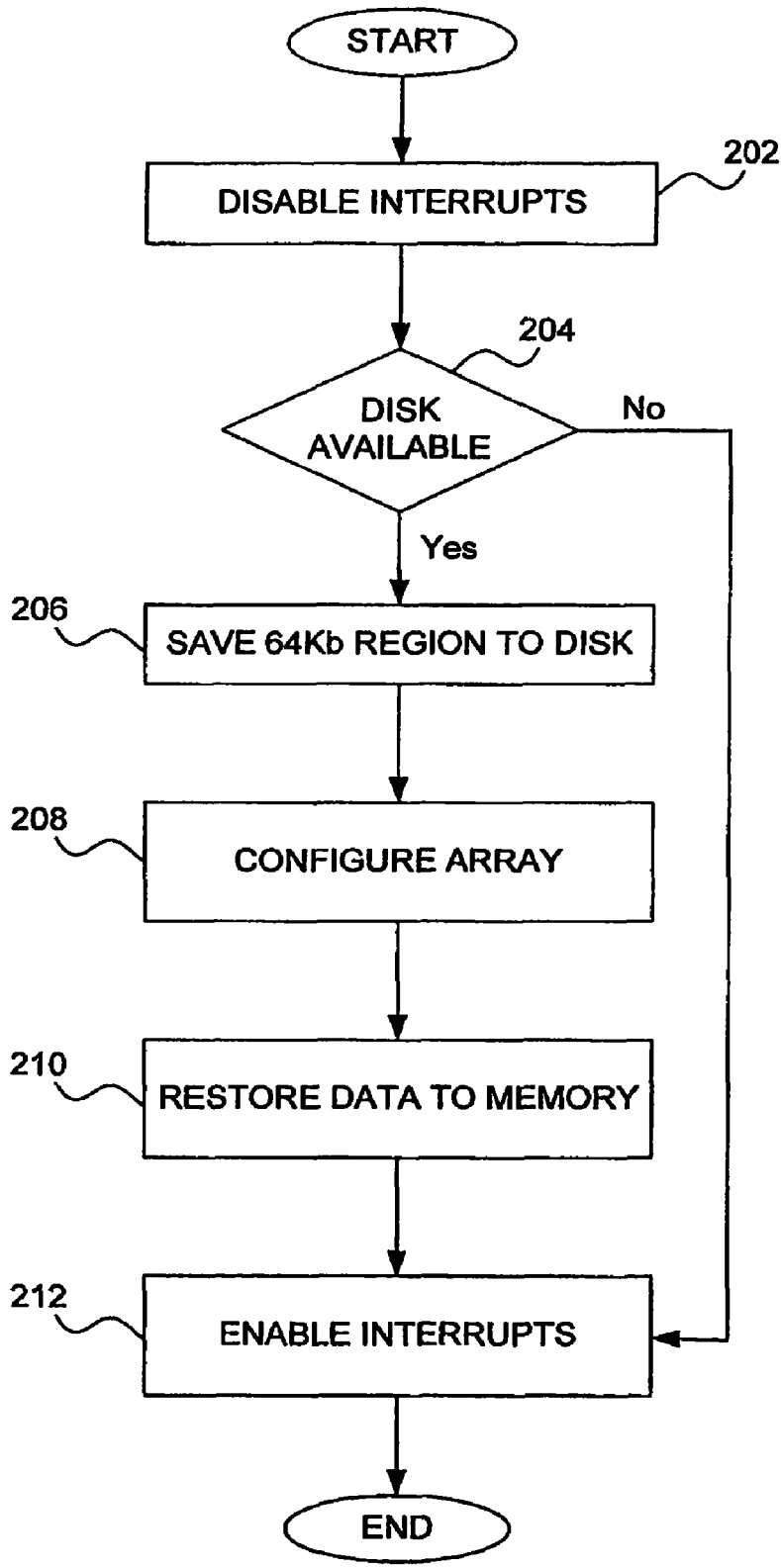
FIG. 2 is a flowchart of a method of obtaining additional memory space during initialization.

An exemplary method employing the features of the invention proceeds along the following steps as shown in the flowchart of FIG. 2.

1. First, in step 202, the system interrupts are disabled. This is done because some more advanced system BIOS's may utilize the 64 KB of space to write data for keyboards, displays, etc. By disabling the interrupts, no data will be written by the system BIOS.

2. Next, in step 204, a check is made for available disks. The system checks to see if there are any disks that are initialized with metadata. Only initialized disks can have data written to them.

3. If a disk is available, then, in step 206, the 64 KB of data in memory is written to that disk.

4. Then, in step 208, an array configuration is performed.

5. After array configuration is completed, in step 210, the data is restored from disk to conventional memory.

6. Thereafter, in step 212, system interrupts are re-enabled.

7. System operations are then continued normally.

If in step 204 no disk is available, then the interrupts are re-enabled immediately. In this special case, there are no initialized drives. Therefore no configuration is necessary, and the 64 KB of memory space is not needed.

Configuration step 208 configures the array to get array information, to process conflicts, to create or delete an array, and in general to perform any array manipulation. Whenever an array manipulation is required, the 64 KB of system memory is needed to perform the configuration steps. The 64

KB of data could also be saved to flash, but that would be slower than saving it to disk and returning it to system memory.

One of the features of the invention is to disable interrupts, to prevent system BIOS from running during the array configuration process. If system BIOS were allowed to continue to run, it could require the use of the 64 KB that the configuration process is using. The result would be chaos and possible complete system failure.

This process works very well in POST during the initialization time, but it cannot be used during driver execution. Array configuration cannot be performed during the driver execution, because there is not enough space in system memory to allow for configuration at that time.

Another aspect of the invention relates to techniques to compensate for disk failures in redundant RAID arrays. Redundant arrays are primarily associated with R1 and R5 arrays; that is, any redundant array where a disk can fail. By way of example, suppose the array comprises a series of disks, for example, disks 1-6. If disk 3 fails, that is, it returns an error when trying to write to the disk such that the data cannot be recovered, then disk 3 must be removed. If the disk is not removed, there will be data corruption down the line. This is because there is no way of knowing which disks were written to and which were not.

When a bad disk drive is discovered, the bad drive is marked "dead" for that array. A reconfiguration must be done so that all of the remaining disks can be written to with the appropriate data and the bad disk ignored. If that array contains a "hot spare," the data will be rebuilt on the hot spare and configuration changes will again be made to take that into account. Once the configuration changes logically remove the "dead" drive from the array, that drive can be physically removed and replaced with a working drive that now becomes the "hot spare." More configuration changes need to be made to enable access to the new hot spare if needed. It can be seen that the configuration data write process is continuous under these circumstances.

Going back to the memory diagram of FIG. 1, executable code is loaded by the system RAM above A00000. The code that is loaded here should be less than 32 KB. Previously, this space limitation had been a problem. In the past, each function required its own card, such as video, keyboard, mouse, etc. If the system contained multiple cards (e.g., 5 cards), it would quickly run out of space. Today, all of these functions are contained on the motherboard. Therefore, typically there is a need to only use one additional card, such as an array controller card.

Data memory contains barely enough information to allow mapping of all the arrays to all the connected disks. There is not enough memory space available to store the configuration codes. During run time, when an I/O (e.g., a write command) comes in from the operating system through an Int13h call, it maps the command to the appropriate disks and returns a "done" command. However, the operating system cannot tell if a disk has failed. Until a configuration change is made to remove the failed disk from the array, Int13h will continue to attempt to write to the failed disk. More problems are created when the system tries to read from the array. The failed disk will cause the data being read out from the array to be corrupted.

Configuration changes cannot be made on the fly, that is, during run time. Since all configuration code has been eliminated from system memory due to space limitations, there is no ability to get enough memory to make changes when a disk fails. There is no memory available to do a reconfiguration during run time. During run time, the Int13h I/O calls come from the operating system, which operates in an entirely different environment than BIOS. Operating system interrupts cannot be disabled during run time. Doing so would wreak havoc on the entire system. Thus, the problem becomes one of how to reconfigure the configuration information when a disk fails during run time, when there is no memory available for the reconfiguration code.

The solution can be broken down into two parts. First, for read operations, the parity can be used to reconstruct the data from the good disks. The reconstructed data can be read back out. During a read cycle, since data is not being updated, there is no chance of corruption.

Figure 3:
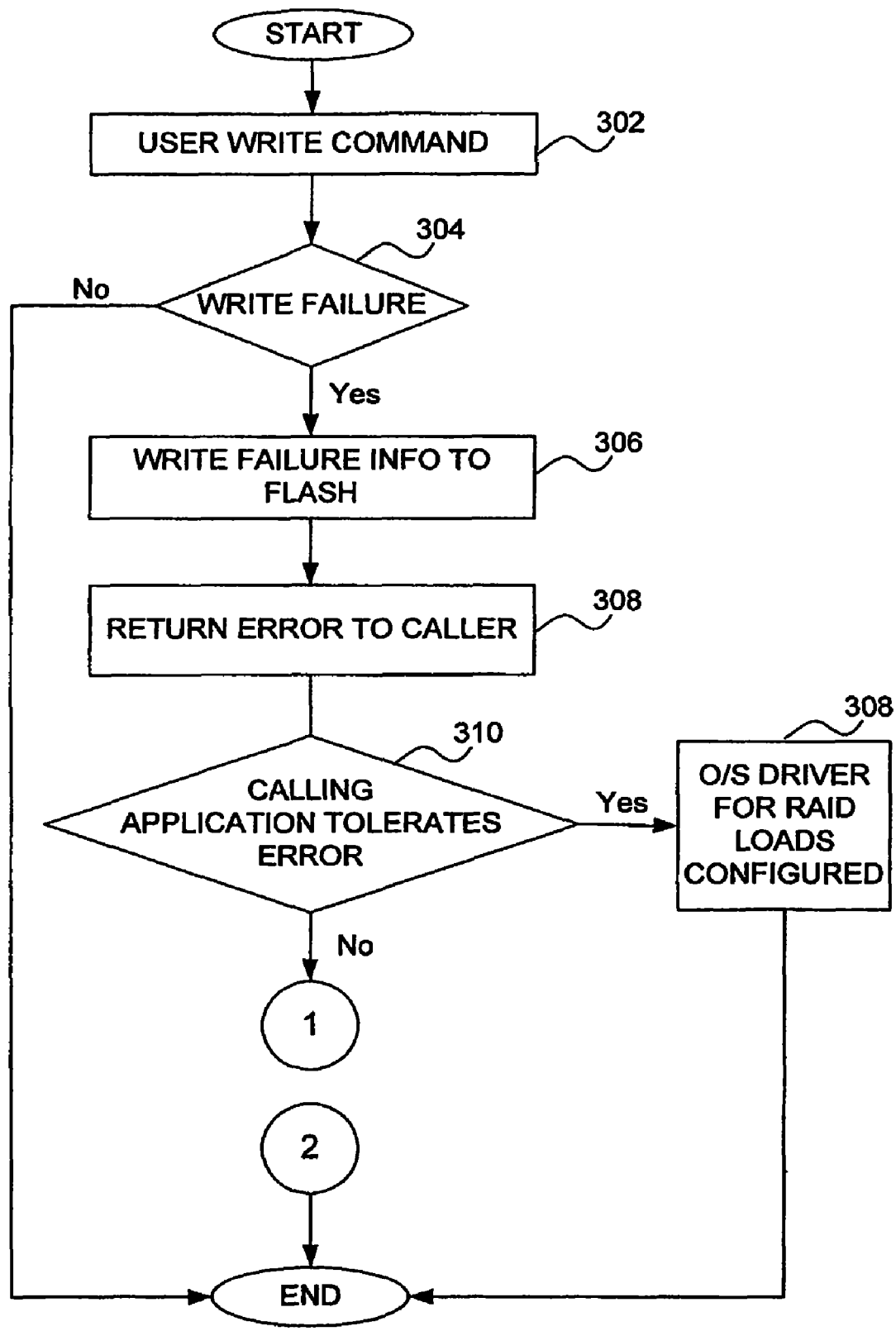
FIG. 3 is a flowchart of a portion of a method used to mark bad disks in a RAID array.

The solution for write operations is more complex. If an attempt is made to write to a bad disk, corruption will most likely occur. The technique for solving the write operation problem is shown in the flowchart of FIG. 3. When the user attempts to write to disk at step 302, the algorithm checks for a write failure at step 304. If no write failure is detected, the process terminates. If a write failure is detected, at step 306 the failure information is written into flash (failure information includes which array and which disk has failed). At step 308 the system returns an error message to the caller (i.e., the application that issued the write command).

At step 310, the process checks to determine whether the system can tolerate the error. In rare instances, the disk error is not fatal and the operating system driver or user making the call can tolerate the error. In that case, booting continues normally, and the array drivers are configured normally.

Figure 4:
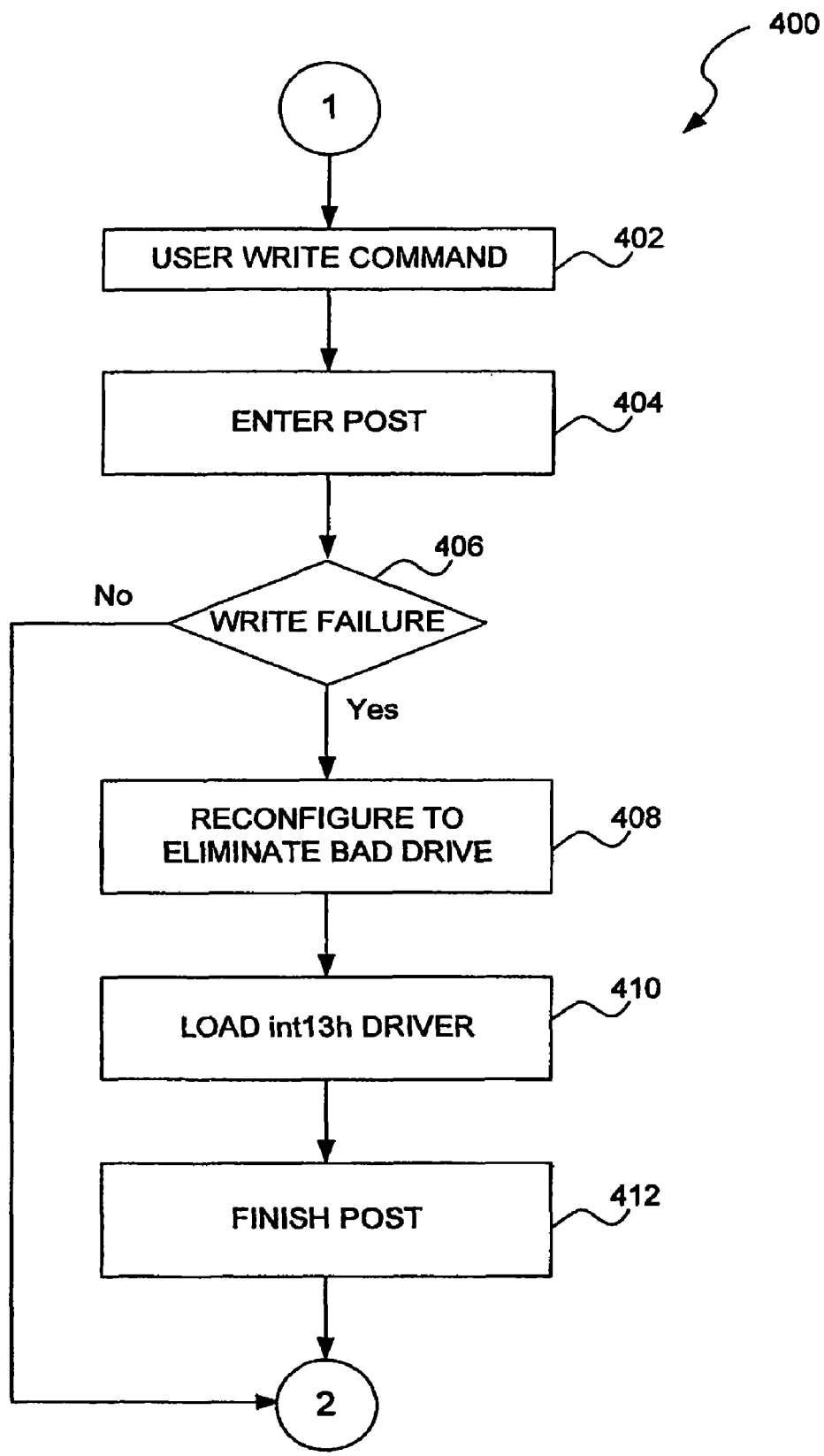
FIG. 4 is a flowchart of a further portion of a method used to mark bad disks in a RAID array.

Normally, when the disk write error is returned, it causes the application that started the write to fail. In that case, the process proceeds to reboot, as shown in the flowchart of FIG. 4, and generally designated as process 400. Since the system is still in a very primitive state, the entire system will reboot.

Specifically, at step 402, the reboot process begins. The system BIOS proceeds to step 404, where it enters the initialization or POST of the RAID BIOS. When POST is executed, a check is made in step 406 as to whether a write error occurred during the previous Int13h execution. If a write error did occur, the RAID BIOS proceeds to step 408, where the RAID array is reconfigured to logically remove the bad disk. During reboot, sufficient memory is freed up, as discussed above, to enable the reconfiguration process to proceed. Once the array has been reconfigured, at step 410 the Int13h driver is loaded. At step 412, POST is completed and the RAID BIOS returns control to the system BIOS.

As noted above, when users perform complex operations, errors can occur that result in the loss of an array and/or data. This can be devastating to a business that has large numbers of records stored in the arrays. It is imperative that there be some way to recover the missing or lost data.

To solve the problem of recovering missing data, all of the configuration information is stored in duplicated ring buffers on all of the disks in the RAID controller. As new configuration data is generated, it is stored in the next available space in each ring buffer. Thus a history of configuration data is maintained in the RAID controller. By using the historical data, old configurations can be rebuilt and data can be restored.

Figure 5:
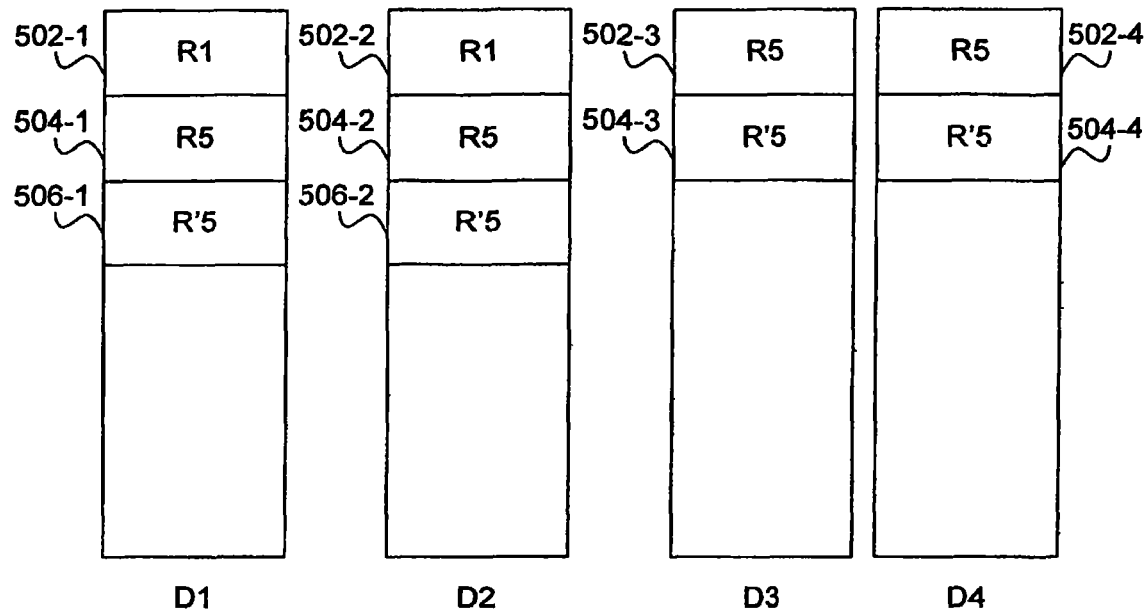
FIG. 5 shows an array comprising drives D1, D2, D3, and D4.
Figure 5:
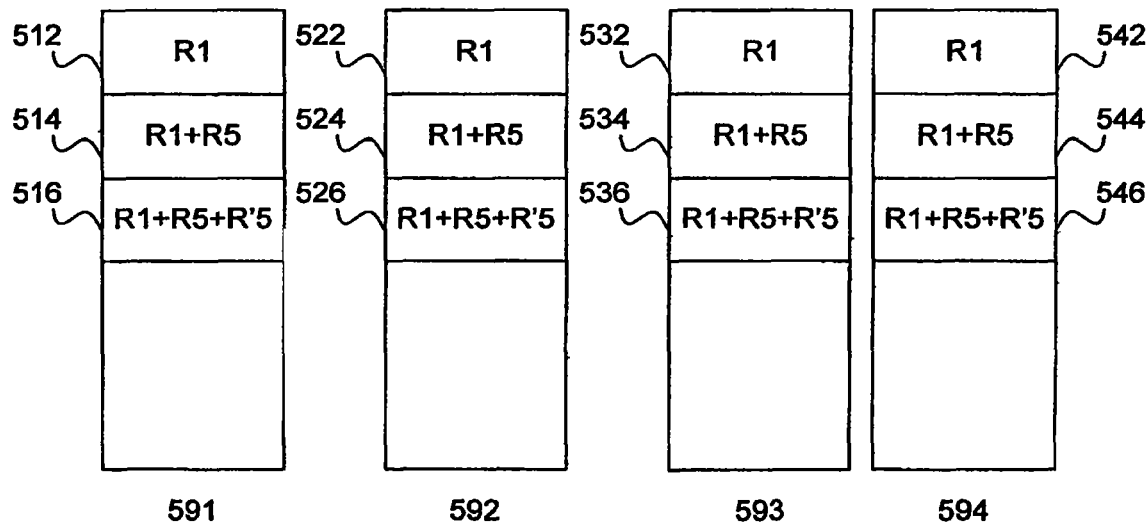

FIG. 5 shows an array comprising disks D1, D2, D3, and D4. Each disk has segments for storing configuration data. FIG. 5 shows an example using two RAID sets, a RAID-1 array and a RAID-5 array. A RAID-1 array comprises at least two disks which mirror data. That is, each disk contains an exact copy of the same data as on the other disk. A RAID-1 array may or may not contain spare disks. In the example of FIG. 5, the RAID-1 array comprises disks D1 and D2. A RAID-5 array uses three or more disks, with zero or more spare-disks. In a RAID-5 array the parity information is distributed evenly among the participating drives. In the example, the RAID-5 array comprises disks D1, D2, D3, and D4.

In order to mirror the RAID 1 and the RAID 5 configuration sets, it is necessary to know where they are on disks D1, D2, D3 and D4. Information about the location of the data on each of the drives must be stored. This is called the configuration data, or metadata. In order to keep track of the changing metadata, a ring buffer is used. In FIG. 5, the ring buffers are regions of disks D1, D2, D3, and D4 denoted as areas 591, 592, 593, and 594, respectively. The latest metadata is stored in the ring buffer, along with all of the previous metadata. As configuration changes occur, the new data are stored in the next available space in the ring buffer rather than overwriting previous data. The storage area is called a ring buffer because once the storage locations in the buffer are filled, new data overwrites the oldest stored data. In this way a history of metadata is maintained, typically for about 100 metadata changes.

As shown in FIG. 5, the same metadata is always placed on every disk. No matter what disk is actually in the system, a complete picture of all of the arrays is on that disk. If disks D1-D4 are newly initialized, the metadata ring buffers 591, 592, 593, and 594 will all be empty. When a RAID1 array is created at 502-1, 502-2, the metadata ring buffers all store the information at locations 512, 522, 532, and 542 of the entire RAID set.

If a second array is added, e.g., the RAID5 set represented by 504-1, 504-2, 502-3, and 502-4, a new set of controller metadata is created and placed in the ring buffers at locations 514, 524, 534, and 544. Next, if a second RAID-5 set is created, R'5, the ring buffers will have the metadata for all three of those arrays placed at locations 516, 526, 536, and 546.

As noted above, the ring buffers have a limited amount of storage space. Typically, configuration data consumes about 1 KB of space. Thus, storage for R1 metadata requires 1 KB, storage for R1+R5 requires 2 KB, and storage for R1+R5+R'5 requires 3 KB of space. Once all of the storage space in the ring buffers is filled, new metadata will be stored in locations 512, 522, 532, and 542 again, thereby overwriting the metadata currently stored there.

Figure 6A:
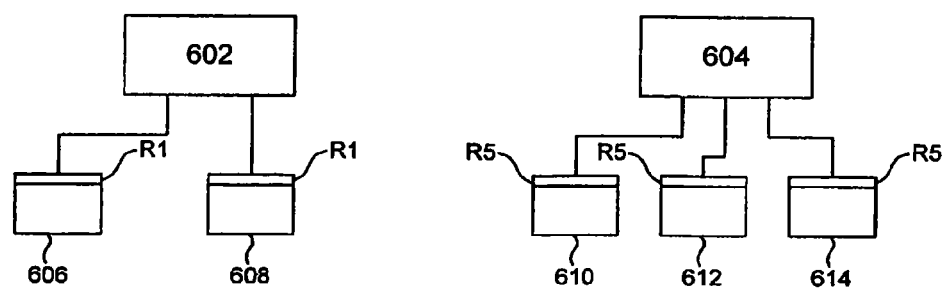
FIG. 6 shows two arrangements of controllers and associated drives.

FIG. 6A shows two controllers 602 and 604. Controller 602 controls two drives, 606 and 608 in a mirrored RAID-1 set. Controller 604 controls three drives, 610, 612, and 614 in a RAID-5 set.

Figure 6B:
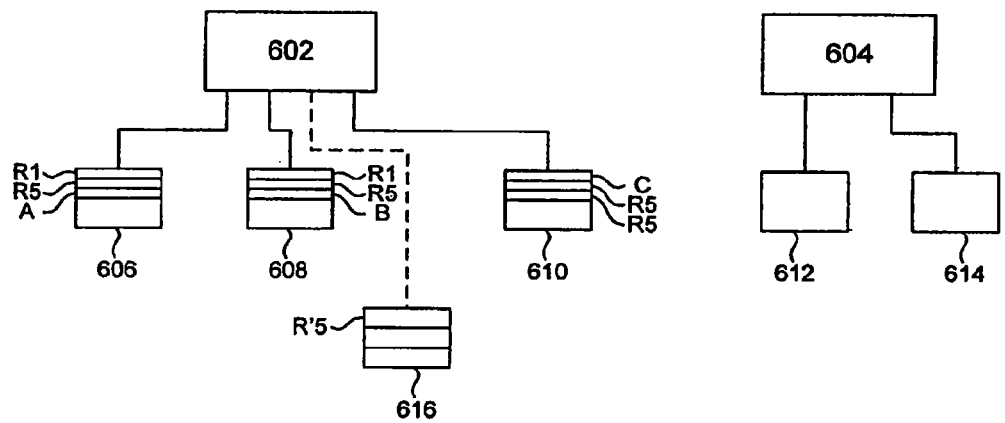

Suppose, as shown in FIG. 6B, drive 610 is removed from the RAID-5 set of controller 604 and is re-connected to controller 602 of the RAID-1 set. Drive 610 has old configuration data on it from its former association with the RAID-5 set of controller 604. Drive 610 appears to have information for a RAID-5 set but is missing two drives. At some point, it may be desirable to create a RAID-5 set under controller 602. The configuration data then needs to be updated on each of drives 606, 608, and 610 under controller 602 to read RAID-1 mirror plus RAID 5. However, drive 610 would not be identical to drives 606 and 608 because the earlier configuration data on drive 610 would be different from the earlier configuration data of drives 606 and 608.

Over time, the location of the first set of configuration data in each of the drives would change. This is because the configuration data will be placed on different parts of the drives. The drives all generate a number to indicate which configuration data is current. So the next update of configuration data would be placed at position A on disk 606, position B on disk 608 and position C on disk 610 since all of the drives are now controlled by the same controller 602.

Assume that the ring buffer on disk 610 is full. Therefore the new configuration data for the latest update would have to go to the top location (location C). When the system next checks for configuration data, it looks at disk 606 and finds that the configuration data in position A is the latest on that drive. The system then checks disk 608 and finds that the configuration data in location B is most current. Finally, the system looks at disk 610 and finds that the most current configuration data is at position C. The system then compares all three drives and notes that the latest configuration data is the same on all drives. The system will therefore use the configuration data on any one of the three drives.

If another drive 616 is then connected to controller 602, as shown by the dashed line connection in FIG. 6B, the configuration data will be different on drive 616 from that of the other three drives connected to controller 602. The history from controller 602 will not be copied over onto the newly added drive. Only the latest information will be copied into the new drive 616. If there is a conflict between the drives, then the controller will look to earlier configuration data in the ring buffer to determine which is the valid data.

Configuration information that is stored includes: metadata, drive information, control information, and logical device information. Storing the configuration data in all of the drives and storing a history of configuration data enables a user to look back at prior configurations to determine where an error may have occurred.

Figure 7:
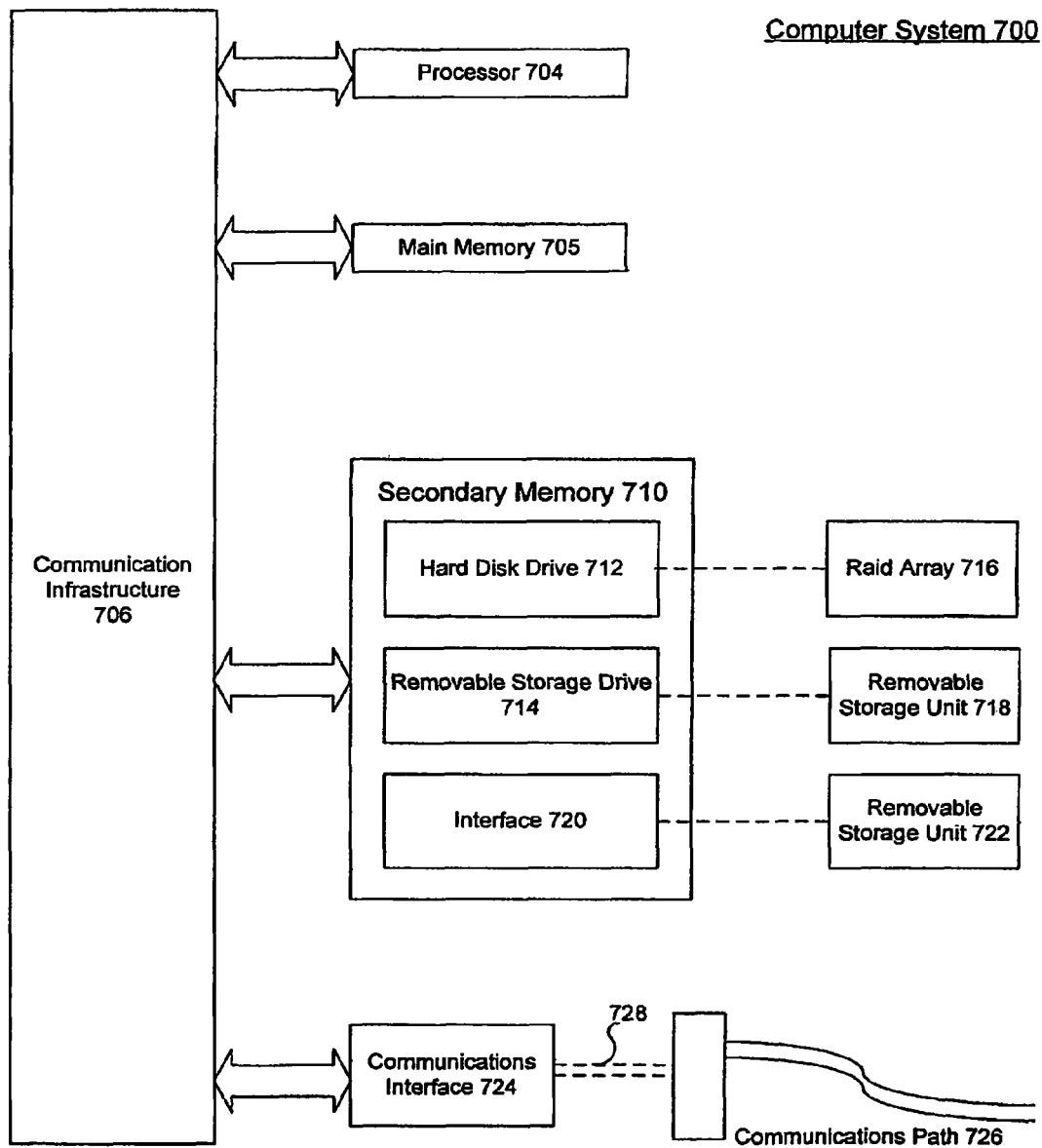
FIG. 7 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 700 is shown in FIG. 7. The computer system 700 includes one or more processors, such as processor 704. Processor 704 can be a special purpose or a general purpose digital signal processor. The processor 704 is connected to a communication infrastructure 706 (for example, a bus or network). Various software implementations are described in terms of this exemplary computer system. After reading this description, it will become apparent to a person skilled in the relevant art how to implement the invention using other computer systems and/or computer architectures.

Computer system 700 also includes a main memory 705, preferably random access memory (RAM), and may also include a secondary memory 710. The secondary memory 710 may include, for example, a hard disk drive 712, and/or a RAID array 716, and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other communications channels.

The terms "computer program medium" and "computer usable medium" are used herein to generally refer to media such as removable storage drive 714, a hard disk installed in hard disk drive 712, and signals 728. These computer program products are means for providing software to computer system 700.

Computer programs (also called computer control logic) are stored in main memory 708 and/or secondary memory 710. Computer programs may also be received via communications interface 724. Such computer programs, when executed, enable the computer system 700 to implement the present invention as discussed herein. In particular, the computer programs, when executed, enable the processor 704 to implement the processes of the present invention. Where the invention is implemented using software, the software may be stored in a computer program product and loaded into computer system 700 using raid array 716, removable storage drive 714, hard drive 712 or communications interface 724.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A computer readable medium having stored thereon computer executable instructions that, if executed by a computing device, cause the computing device to perform a method comprising:
    (a) detecting a write failure to at least one disk of a redundant array;
    (b) moving a segment of data from a Basic Input/Output System (BIOS) memory region of system memory during Power-On Self Test (POST) to a second disk to free a segment of system memory and enable reconfiguration of the redundant array; and
    (c) using the segment of freed memory to reconfigure the redundant array to logically remove a faulty drive that caused the write failure and prevent write corruption in the redundant array.

2. The computer readable medium of claim 1, further comprising executable instructions for:
    (d) returning the segment of data from the second disk back to system memory.

3. The computer readable medium of claim 2, wherein the executable instructions for step (d) if executed by a computing device, cause the computing device to further perform the step of:
    returning the segment of data from the second disk back to system memory after Power-On Self Test (POST).

4. The computer readable medium of claim 1, wherein the executable instructions for step (c) further comprises:
    reconfiguring the redundant array using a Basic Input/Output System (BIOS) of the redundant array.

5. The computer readable medium of claim 1, further comprising executable instructions for:
    (d) writing failure information to non-volatile storage.

6. The computer readable medium of claim 5, further comprising executable instructions for:
    (e) reading the failure information from the non-volatile storage upon system reboot.

7. The computer readable medium of claim 5, wherein the executable instructions for step (d) further comprises:
    writing said failure information to flash memory.

8. The computer readable medium of claim 5, wherein the executable instructions for step (d) further comprises:
    (e) writing said failure information to non-volatile memory on a Redundant Array of Independent Disks (RAID) controller.

9. The computer readable medium of claim 5, wherein the executable instructions for step (d) further comprises:
    (e) writing said failure information to disk space.

10. A method of preventing write corruption in a redundant array in a computer system, comprising:
    detecting a write failure to at least one disk of the redundant array;
    moving a segment of data from a Basic Input/Output System (BIOS) memory region of system memory during Power-On Self Test (POST) to a second disk to free a segment of system memory and enable reconfiguration of the redundant array;
    and
    using the segment of freed memory to reconfigure the redundant array to logically remove a faulty drive that caused the write failure and prevent write corruption in the redundant array.

11. The method of claim 10, further comprising:
    returning the segment of data from the second disk back to system memory.

12. The method of claim 10, further comprising:
reconfiguring the redundant using a Basic Input/Output System (BIOS) of the redundant array.

13. The method of claim 10, further comprising:
writing failure information to non-volatile storage.

14. The method of claim 13, further comprising:
reading the failure information from the non-volatile storage upon system reboot.

15. The method of claim 13, wherein the writing step comprises:
writing said failure information to flash memory.

16. The method of claim 13, wherein the writing step comprises:
writing said failure information to non-volatile memory on a Redundant Array of Independent Disks (RAID) controller.

17. The method of claim 13, wherein the writing step comprises:
writing said failure information to disk space.

18. A computer readable medium having stored thereon computer executable instructions that, if executed by a computing device, cause the computing device to perform a method comprising:
detecting a write failure to at least one disk of a redundant array;
moving a segment of data from system memory to a second disk to free a segment of system memory and enable reconfiguration of the redundant array;
using the segment of freed memory to reconfigure the redundant array to logically remove a faulty drive that caused the write failure and prevent write corruption in the redundant array;
determining whether the computer system can tolerate the write failure; and
rebooting if the system cannot tolerate the write failure.

19. The computer readable medium of claim 18, wherein the executable instructions for the using step further comprise instructions that, if executed by the computing device, cause the computing device to:
reconfigure the redundant array using a Basic Input/Output System (BIOS) of the redundant array.

20. A method of preventing write corruption in a redundant array in a computer system, comprising:
detecting a write failure to at least one disk of the redundant array;
moving a segment of data from system memory to a second disk to free a segment of system memory and enable reconfiguration of the redundant array;
using the segment of freed memory to reconfigure the redundant array to logically remove a faulty drive that caused the write failure and prevent write corruption in the redundant array;
determining whether the computer system can tolerate the write failure; and
rebooting if the system cannot tolerate the write failure.

\* \* \* \* \*